United States Patent [19]

Shinozaki et al.

[11] Patent Number: 5,109,250
[45] Date of Patent: Apr. 28, 1992

[54] PROGRAM SHUTTER

[75] Inventors: Nobuo Shinozaki; Yoichi Seki; Shigeru Tagami, all of Yotsukaido, Japan

[73] Assignee: Seikosha Co., Ltd., Japan

[21] Appl. No.: 452,565

[22] Filed: Dec. 18, 1989

[30] Foreign Application Priority Data

Dec. 16, 1988 [JP] Japan .................. 63-163317[U]

[51] Int. Cl.$^5$ .................................................. G03B 7/08
[52] U.S. Cl. .................................. 354/439; 354/234.1
[58] Field of Search ............................ 354/439, 234.1

[56] References Cited

U.S. PATENT DOCUMENTS

| 4,648,701 | 3/1987 | Ogihara et al. | 354/439 |
| 4,693,583 | 9/1987 | Ogihara et al. | 354/439 |
| 4,696,560 | 9/1987 | Ogihara et al. | 354/439 |
| 4,697,908 | 10/1987 | Ogihara et al. | 354/439 |
| 4,782,353 | 11/1988 | Ogihara et al. | 354/439 |
| 4,864,346 | 9/1989 | Shinozaki et al. | 354/439 |
| 4,864,347 | 9/1989 | Nakagawa et al. | 354/439 |
| 4,933,695 | 6/1990 | Ishida et al. | 354/234.1 |

Primary Examiner—Russell E. Adams
Attorney, Agent, or Firm—Bruce L. Adams; Van C. Wilks

[57] ABSTRACT

A program shutter for automatic exposure control including a forwardly/reversibly rotatable step motor for opening and closing a shutter to effect automatic exposure in the control circuit for controlling the operation of the step motor. The control circuit includes stored predetermined shutter mechanism characteristic values. The reversible stepping motor varies the lens aperture in response to a pulsed lens control signal generated by the control circuit. The corresponding value associated with each pulse is varied to be synchronized with and dependent on the shutter mechanism characteristic values and correspondingly varies the rotational power of the reversible stepping motor to overcome detrimental inherent shutter mechanism characteristics and to increase the response efficiency of the shutter.

5 Claims, 4 Drawing Sheets

PROGRAM SHUTTER

BACKGROUND OF THE INVENTION

This invention relates to a program shutter and more particularly, to a program shutter of the type wherein the open/close action of shutter blades is performed by a stepping motor.

A program shutter of the type wherein the open/close action of shutter blades is performed by a stepping motor is configured such that upon control of a release button, a drive pulse signal having a given period is supplied to the stepping motor, the motor rotates forward to gradually open sectors, when a stepping rotation corresponding to an exposure level has taken place the phase of the drive pulse signal is changed, and the stepping motor rotates backward to close the sectors, whereby a proper exposure is obtained.

In such a shutter whose sectors are opened and closed by a stepping motor, however, since a sector operating member is restricted by a spring to a reference position in the quiescent state to prevent the actuation of the sectors, a load owing to the spring is imposed on the stepping motor in the course of sector opening, and due to the inertia of each component in motion or the fitting error of each component, the variation of aperture diameter relative to the elapse of time in the course of opening becomes uneven, resulting in a problem of no accurate exposure control being accomplished.

Therefore, to solve the foregoing problem, the present applicant has proposed in Japanese Patent Application No. 61-297909 to make a drive pulse signal for a stepping motor have a pulse width as synchronized to the operating characteristic of a shutter mechanism, which is featured in that a lag portion of the operating characteristic is compensated by elongating the pulse width. Since such log is especially apparent when the stepping motor changes from forward to backward rotation and the pulse width must always be elongated. Thus, another problem results that increasing the response time of a program shutter performing so-called triangular waveform exposure is difficult to accomplish.

Further, if a high-speed, powerful stepping motor is used to increase the speed, or to actuate shutter blades at high speed so that a very short exposure time can be attained at high speed, this provision is unfavorable from the standpoint of cost.

SUMMARY OF THE INVENTION

In view of the foregoing problems, it is an object of the present invention to provide a high-speed program shutter whose sectors give an even variation in aperture diameter in the course of opening.

To accomplish the foregoing object, the present invention prepares a drive voltage pulse signal as synchronized to the operating characteristic of a shutter mechanism composed of sectors for forming a lens aperture and a reversible stepping motor for opening and closing the sectors and drives the stepping motor using the pulse signal, thereby making the variation of aperture diameter even.

DETAILED DESCRIPTION OF THE INVENTION

Figure 1A:
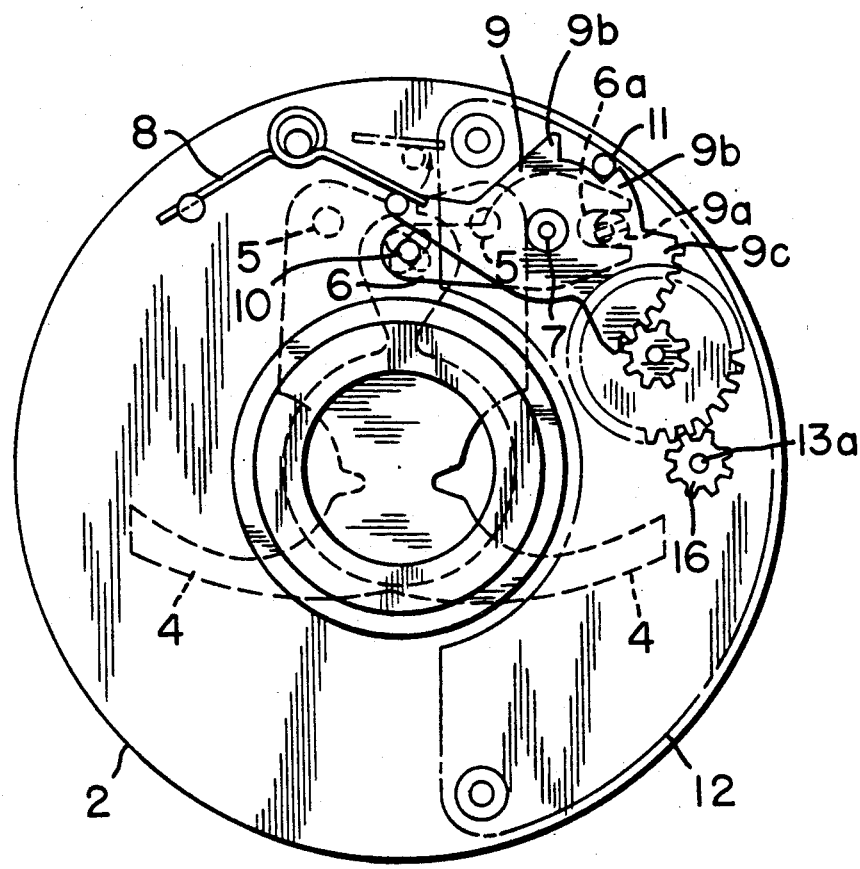
FIG. 1(a) is a front view of an embodiment of a shutter mechanism to which the present invention is applied.

The present invention will now be described in greater detail with reference to embodiments shown in the drawings.

Figure 1B:
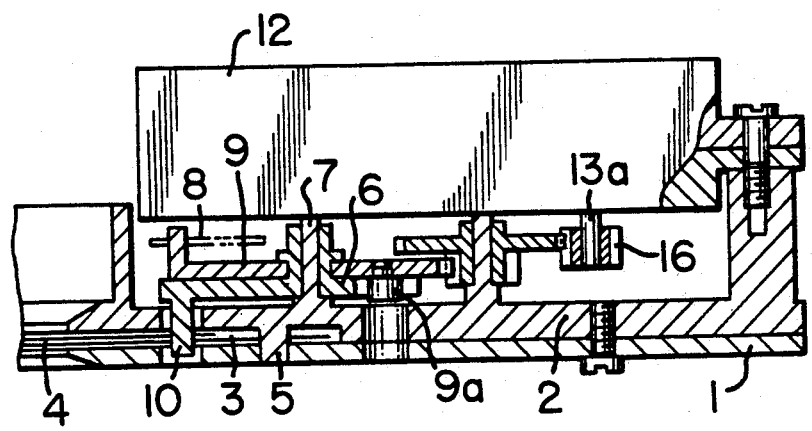
FIG. 1(b) is a sectional view of an embodiment of a shutter mechanism to which the present invention is applied.

FIGS. 1(a) and 1(b) show an example of a shutter mechanism to which the present invention is applied, in which reference numeral 1 designates a base board on which a bottom board 2 is attached for positioning a lens, a sector chamber 3 is formed between the base board 1 and the bottom board 2, and in this chamber, two sectors 4 and 4 are rotatably supported by pins 5 and 5, which symmetrically rotate to determine a lens aperture. 6 designates a sector drive lever which is rotatably supported by a shaft 7 mounted on the bottom board 2, a groove 6a formed at an end of the lever 6 is engaged with a pin 9a of a sector drive wheel 9 hereinafter described which is rotatably supported by the shaft 7, and a sector pin 10 of the lever 6 provided on the side of the base board is engaged with the sectors 4 and 4. 9 designates the sector drive wheel mentioned above which is rotatably supported by the shaft 7 such that it is restricted to a reference position in the quiescent state by degree determining portions 9b and 9b formed on its periphery and a spring 8 for providing a counterclockwise bias, and a tooth portion 9c formed at an end of the wheel 9 is connected via a gear train to a drive shaft 13a of a stepping motor 12 hereinafter described.

In the drawing, reference numeral 11 designates a pin which comes to engagement with the degree determining portions 9b and 9b of the sector drive wheel 9 to limit the rotatable range thereof.

Figure 2A:
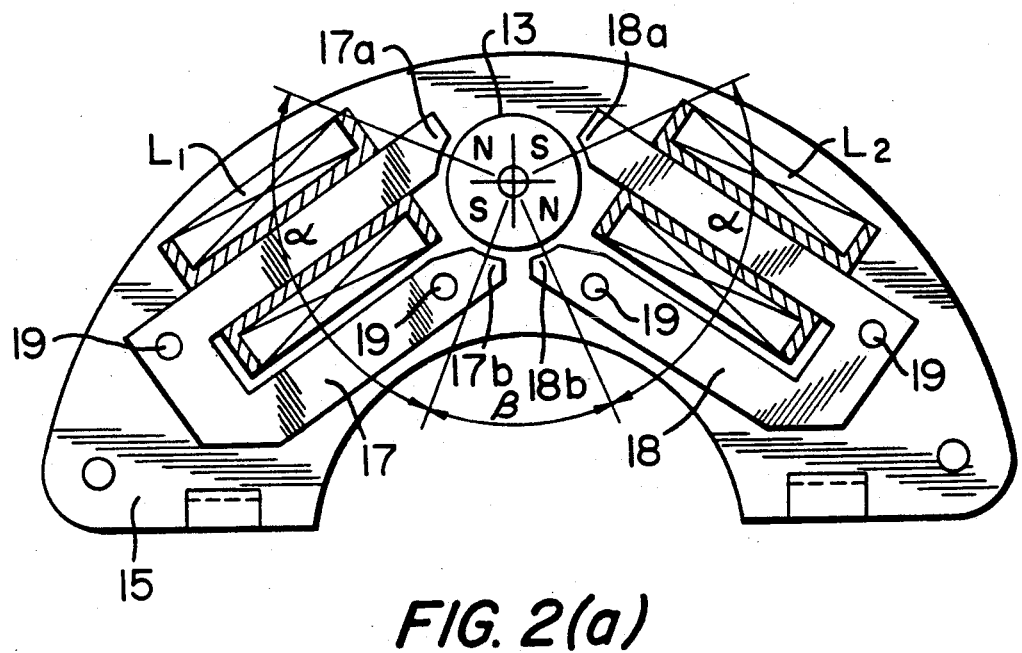
FIG. 2(a) is a front view showing an embodiment of a stepping motor to which the present invention is applied.
Figure 2B:
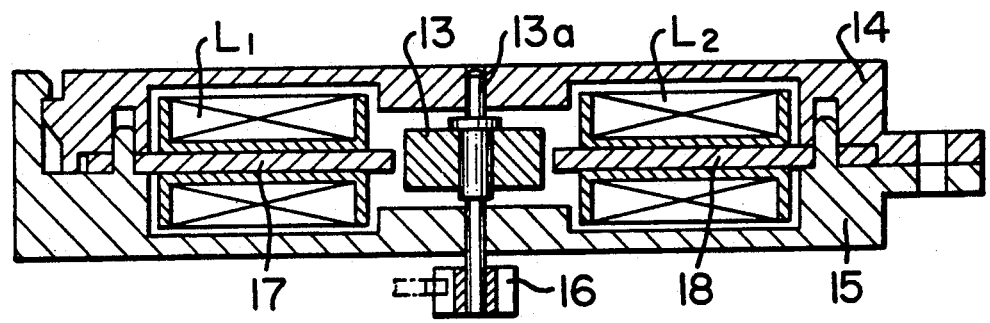
FIG. 2(b) is a sectional view showing an embodiment of a stepping motor to which the present invention is applied.

FIGS. 2a and 2(b) show an embodiment of the stepping motor 12 mentioned above, in which reference numeral 13 designates a four-pole rotor made of permanent magnet, which is rotatably supported by an upper board 14 and a lower board 15 via the rotor shaft 13a whose one end projects, and which is adapted, via a pinion 16 secured to the shaft 13a, to drive the sector drive wheel 9 of the shutter mechanism. 17 and 18 designate U-shaped stators made of magnetic material, each having two leg portions, one leg portion of each stator having an exciting coil L1, L2 wound thereon, and the respective ends of the stators having magnetic pole portions 17a, 17b, 18a and 18b formed such that an angle $\alpha$ made by the corresponding pole portions in relation to the rotor 13 becomes about 90°. The stators 17 and 18 are positioned by guide pins 19 to assume a "〉〈" shape such that an angle $\beta$ made by the magnetic pole portions 17b and 18b in relation to the rotor 13 becomes about 45°, whereby the rotor 13 can rotate forward and backward with one step equal to 45°.

A control device which is a featured portion of the present invention will be described.

Figure 3:
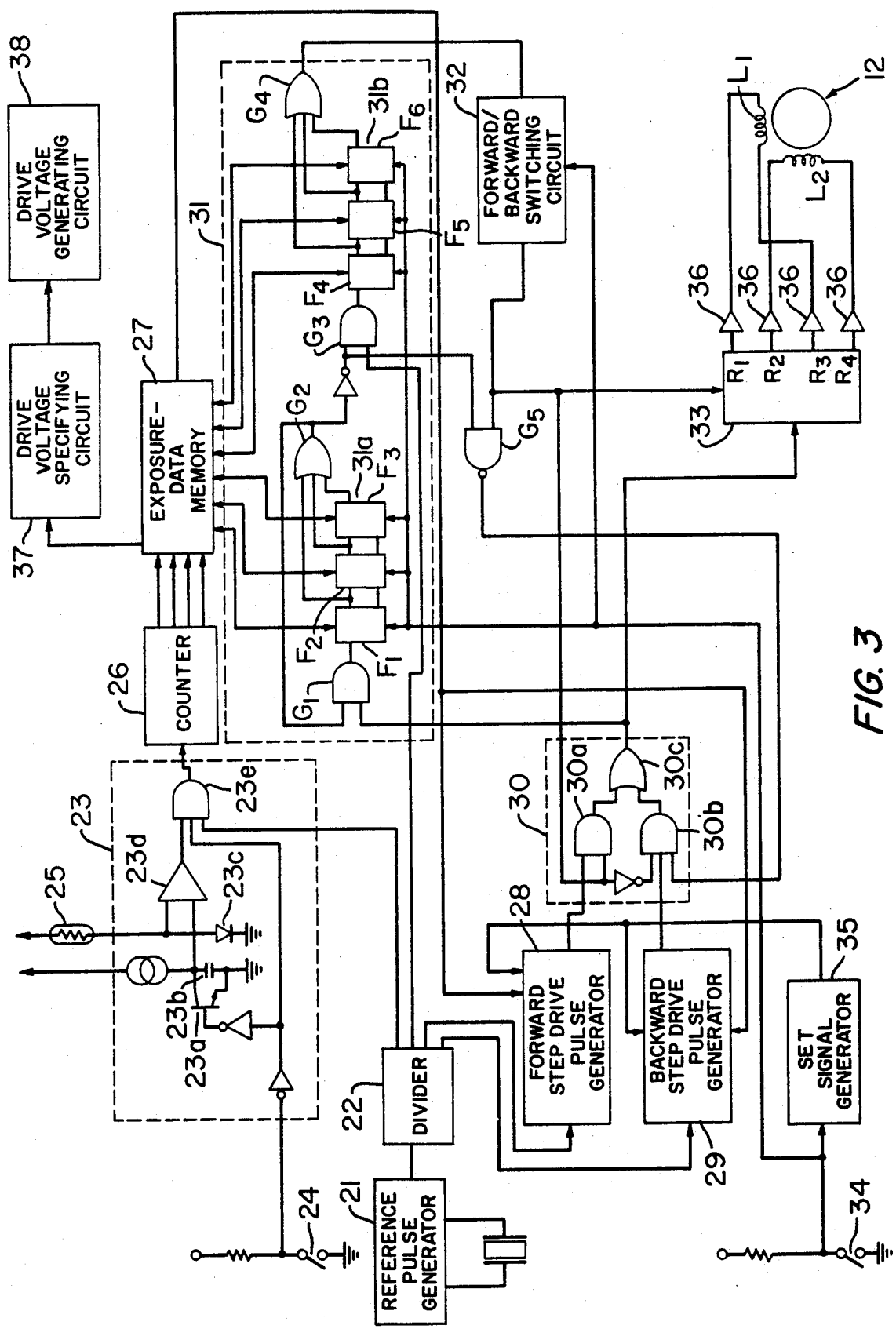
FIG. 3 is a block diagram showing an embodiment of a shutter control device according to the present invention.

FIG. 3 shows an embodiment of the control device, in which reference numeral 22 designates a divider circuit which frequency-divides at a given ratio a signal from a reference pulse generator 21 including a quartz resonator to generate a clock ck1 used in digitizing photometric data, clock ck2 and clock ck3 for step driving, and a clock ck4 for interpolation, and 23 designates a brightness detector circuit which is configured such that upon actuation of a switch 24 interlocked to a release button not shown, a capacitor 23b is charged with a constant current by means of an ON/OFF transistor 23a, a comparator 23d compares the charged voltage of the capacitor 23b with the terminal voltage of a log-compression diode 23c connected in series to a light receiving element 25 such as a Cds, a gate 23e opens at the time of actuation of the switch 24 to pass the clock ck1 to a counter circuit 26 hereinafter described, and this gate 23e closes upon inversion of the comparator 23d to stop the delivery of the clock ck1, whereby the brightness of an object of shooting is provided in digital form. 26 designates the counter circuit mentioned above which is configured such that upon actuation of the switch, it is cleared and concurrently begins to count the object brightness data from the brightness detector circuit 23, and then provides the thus counted content. 27 designates an exposure-data memory circuit for storing stepping motor drive data corresponding to the object brightness, which is configured such that it can access both step count data on the basis of which the stepping motor is to be rotated and interpolation data for compensation of an exposure error resulting from such a step count in accordance with the count content of the counter circuit 26. Further, the memory circuit 27 is storing data inclusive of the pulse width of each pulse and drive voltages to be applied to the coils L1 and L2, that data being read out immediately before each step in accordance with the output of a counter 31a or 31b.

Further, the drive voltage data for each step is sent to a drive voltage specifying circuit 37 immediately before each step, held there during one pulse generation interval, and then sent to a drive voltage generating circuit 38. The drive voltage generating circuit 38 includes an error amplifier, a reference voltage source, etc., and can provide a given voltage output in accordance with the output of the drive voltage specifying circuit 37, this voltage output being used as a source for driver circuits 36. Accordingly, drive voltage V1, V2 and V3 to be applied to the coils L1 and L2 in terms of each pulse vary on the basis of the data of the memory circuit 27.

28 designates a forward step drive pulse generating circuit which is configured such that it generates, on the basis of the clock ck2 for step driving, pulses P1 ... Pn capable of forward driving the stepping motor in opposition to the load of a position limiting spring (FIG. 1a and 1b) of the shutter mechanism, but stops the delivery of such pulses upon inversion of a forward/backward switching circuit 32 hereinafter described. 29 designates a backward step drive pulse generating circuit which is configured such that it provides, on the basis of the clock ck3 for step driving and after inversion of the forward/backward switching circuit 32, pulses Q1 ... Qn capable of backward driving the stepping motor. 30 designates a pulse switching circuit which comprises an AND gate 30a for receiving the pulse Pn from the pulse generating circuit 28 and the signal of the forward/backward switching circuit 32, another AND gate 30b for receiving the pulse Qn from the pulse generating circuit 29 and the inverted signal of the forward/backward switching circuit 32, and an OR gate 30c connected to the AND gates 30a and 30b, and which is configured such that it selects and provides the pulse Pn during forward rotation or the pulse Qn during backward rotation. 31 designates a rotation mode switching counter which is composed of a first presetable down-counter 31a made of flip-flops F1 to F3 cascade-connected and a second presetable down-counter 31b made of flip-flops F4 to F6 cascade-connected, and which is configured such that the first counter 31a is preset with the step count from the exposure-data memory circuit 27 at the beginning of forward rotation and at the beginning of backward rotation of the pulse motor, is decremented by 1 in response to each pulse P/Q, and provides a signal through an output gate G2 when the counter content becomes zero; on the other hand, the second counter 31b is preset with the interpolation data from the exposure-data memory circuit 24 at the beginning of forward rotation of the pulse motor, is decremented by 1 in response to each clock ck4 for interpolation after the content of the first counter 31a becomes zero, and provides a signal through an output gate G4 when the content of itself becomes zero. Here, the data for determination of the pulse width of each pulse of the foregoing P1 to Pn and Q1 to Qn is sent, depending on the outputs of the counters 31a and 31b and immediately before each pulse is provided, from the memory circuit 27 to the forward step drive pulse generating circuit 28 or the backward step drive pulse generating circuit 29.

32 designates the forward/backward switching circuit which latches the signal from the mode switching counter circuit 31 and actuates the pulse switching circuit 30 to change from the pulse P to the pulse Q and concurrently change the pulse shift direction of a stepping motor driving circuit 33 hereinafter described, and 33 designates the stepping motor driving circuit mentioned above which is made of a so-called ring counter wherein a signal delivery terminal shifts to an adjacent terminal in sequence in response to each entry of the pulse signal, and which is configured such that with the pulse shift direction changed in accordance with the signal from the forward/backward switching circuit 32, it actuates and drives the stepping motor forward or backward in response to the entry of pulses from the pulse switching circuit 30.

Reference numeral 34 designates a second switch which upon control of the release button resets the rotation mode switching counter 31 and the forward/backward switching circuit, 35 designates a set signal generating circuit which upon actuation of the switch 34 sets the pulse generating circuits 28 and 29, and 36 designates driver circuits which use the drive voltage generating circuit 38 as a power source, amplify the signals from the output terminals R1 to R4 of the stepping motor driving circuit 33, and supply them to the exciting coils L1 and L2 of the stepping motor.

The operation of the thus configured device will be described with reference to the timing chart of FIG. 4.

After a power switch not shown is switched on and when the release button of a camera body is depressed to a first position, the first switch 24 is switched on, the object brightness detector circuit 23 is actuated, the clock ck1 is delivered whose number of pulses corresponds to the object brightness, and the brightness data is stored in the counter 26. On the basis of the brightness data of the counter 26, the exposure-data memory circuit 27 provides a step count adapted to cover the exposure level and an interpolation value used to compensate the resultant stepping rotation, and presets them in the first down-counter 31a and the second down-counter 31b of the rotation mode switching counter circuit 31, whereby the exposure data corresponding to the object brightness is set.

When the release button is depressed to a second position after the foregoing setting operation is completed, the switch 34 switches on, the rotation mode switching counter 31 and the forward/backward switching circuit 32 are reset, and concurrently, the forward step drive pulse generating circuit 28 and the backward step drive pulse generating circuit 29 are actuated to generate the pulse P and the pulse Q. The pulse switching circuit 30 selects the pulse P and sends it to the first counter 31a of the rotation mode switching counter 31 and to the stepping motor driving circuit 33. Since the drive voltage data and pulse width data for each step are sent from the memory circuit 27 through the drive voltage generating circuit 38 to the driver circits 36 and the pulse generating circuit 28, upon each entry of the pulse P, the stepping motor 12 rotates forward in response to pulses of given drive voltage and pulse width step by step in opposition to the load of the spring 8 (FIG. 1) to open the sectors 4 and 4 as illustrated by the solid line in FIG. 4(a), and concurrently, the first down-counter 31a is decremented by 1 at a time.

Figure 4A:
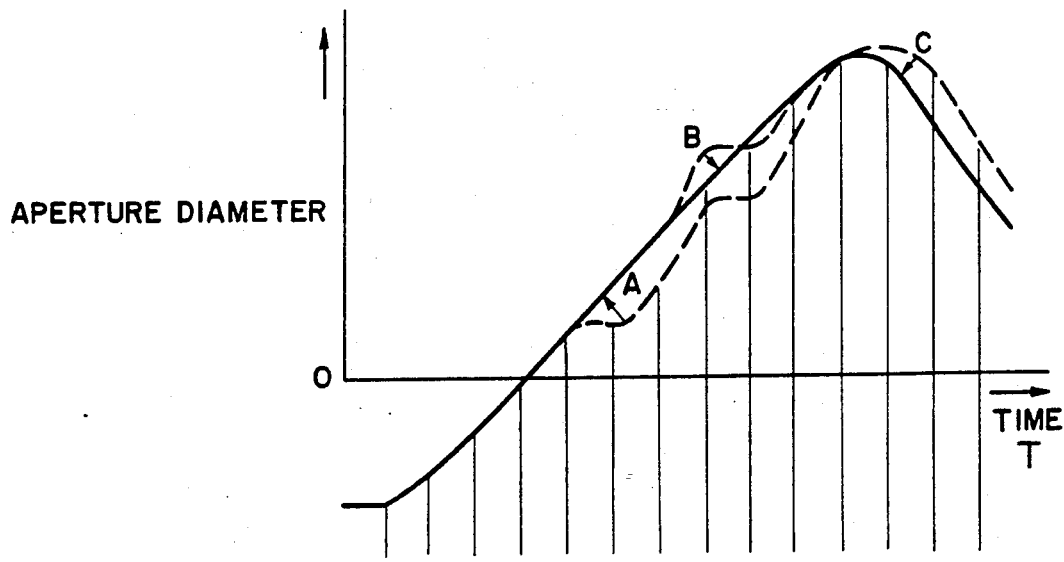
FIG. 4(a) is an explanatory chart showing the operation of the above device.
Figure 4B:
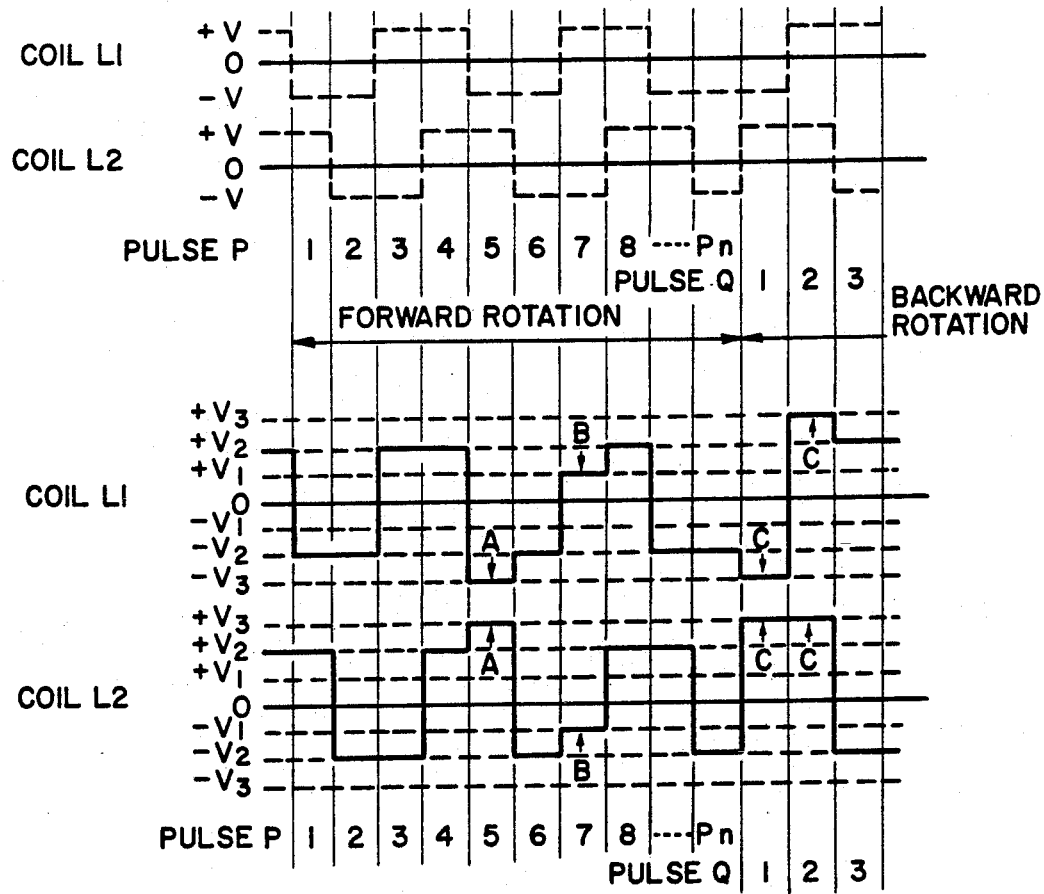
FIG. 4(b) is an explanatory chart showing the operation of the above device.

Specifically, according to the conventional device, the pulse P of fixed voltage as illustrated by the broken line in FIG. 4(b) is used for driving, the operating characteristic of the shutter mechanism involves a hunting phenomenon as illustrated by the broken line in FIG. 4(a), and the variation of aperture diameter relative to the elapsed time becomes uneven; on the contrary, according to the present invention, the memory circuit 27 specifies the pulse P of drive voltage V1, V2, V3 preset in accord with the operating characteristic as illustrated by the solid line in FIG. 4(b), thus, the sectors 4 and 4 are actuated in such a manner as illustrated by the solid line in (a).

That is, to change the uneven aperture diameter as illustrated by the broken line in FIG. 4(a) to the even aperture diameter as illustrated by the solid line, the pulse P5 according to the present invention is set to a high voltage ($\pm V3$); as a result, the sectors 4 and 4 are quickly moved in the direction of the arrow A, and also to change the uneven aperture diameter as illustrated by the broken line in FIG. 4(a) to the even aperture diameter as illustrated by the solid line, the pulse P7 is set to a low voltage ($\pm V1$); as a result, the sectors 4 and 4 are slowly moved in the direction of the arrow B.

Further, to change the aperture diameter from the lag state due to the inertia of associated components and the like that arises when changing from forward to backward rotation as illustrated by the broken line in FIG. 4(a) to the proper state as illustrated by the solid line, the pulses Q1 and Q2 are set to a high voltage ($\pm V3$); as a result, the sectors 4 and 4 are quickly reversed in the direction of the arrow C.

In this way, when an n-th pulse Pn preset is supplied to the first down-counter 31a, the clock ck4 for interpolation is sent from the gate G3 to the second counter 31b while the stepping motor is rotating toward the final step.

When the clock ck4 corresponding to the preset count of the second counter 31b is supplied, the forward/backward switching circuit 32 is inverted to cause the pulse switching circuit 30 to deliver the pulse Q and at the same time, the stepping motor driving circuit 33 to switch to a backward drive mode. Consequently, the pulse Q is sent from the pulse switching circuit 30 to the driving circuit 33, the stepping motor is forcibly reversed, and the sectors are moved backward stepwisely in synchronism with the pulse Q by the aid of the counterclockwise bias force accumulated in the position control spring 8, whereby the sectors 4 and 4 are closed. As is the case of forward rotation, the pulse Q is a drive voltage pulse as synchronized to the operating characteristic that is set in the memory circuit 27.

When the foregoing operation is complete, the output signal of the forward/backward switching circuit 32 and the inverted output signal of the OR gate G2 actuate, via a NAND gate G5, the AND gate 30b, so that the backward step drive pulse cannot be delivered through the OR gate 30c; thus, the motor 12 stops, the release button returns to its original position, and the switch 24 opens to prepare a next shooting.

Although the foregoing description has been made such that to direct the pulse P5 and the pulses Q1 and Q2 to the arrow-A direction and the arrow-C direction, respectively, and to direct the pulse P7 to the arrow-B direction, the drive voltage is amended so as to cause high-voltage driving and low-voltage driving, respectively; it is sufficient to set the data of the memory circuit 27 in consideration of the operating characteristic experimentally depending in what direction amendment is to be made, which pulse is to be amended, and the like.

Further, although the foregoing embodiment uses one drive voltage specifying circuit and generating circuit for the coils L1 and L2, a greater effect will be obtained if the foregoing circuitry is provided separately for each of the coils L1 and L2.

Although the foregoing embodiment sets the voltages being supplied to the coils L1 and L2 for each pulse, the currents of the coils L1 and L2 may be controlled for each pulse.

As described above, according to the present invention, the drive voltage is set as synchronized to the operating characteristic of the shutter mechanism correspondingly to each pulse. Consequently, the variation of aperture diameter of the sectors relative to the elapsed time becomes even, the sectors can be actuated smoothly and quickly from the open state to the closed state, exposure control can be carried out at high speed and with high accuracy in relation to the object brightness, a proper aperture diameter and synchronous flash actuation can be attained for any distance in flash shooting, and precise control can be accomplished.

Further, because of smooth action, the reliability of exposure action can be improved.

We claim:

1. A program shutter comprising a shutter mechanism composed of sectors for forming a lens aperture in exposure action and a reversible stepping motor for opening and closing said sectors, arithmetic circuit means for computing an exposure level corresponding to an object brightness, counting means for providing on the basis of the exposure level a step count in accordance with which said stepping motor rotates, pulse circuit means for providing on the basis of the step count from said counting means drive voltage/current pulses as synchronized to the operating characteristic of said shutter mechanism, and driving means for rotating on the basis of the pulses from said pulse circuit means said motor forward and backward.

2. A program shutter for automatic exposure control comprising: variable lens aperture means operative when driven to define a variable lens aperture; a reversible stepping motor for driving said variable lens aperture means in response to drive signal pulses; and control circuit means for storing a predetermined shutter characteristic value, detecting object brightness, and generating drive signal pulses dependent on the object brightness detected and on the stored shutter characteristic value, each drive signal pulse having a variable voltage and/or current pulse characteristic which varies relative to other drive signal pulses in dependence on the shutter characteristic value to correspondingly vary the rotational power of said reversible stepping motor.

3. A program shutter for automatic exposure control as in claim 2; wherein said control circuit means includes a brightness detector circuit for detecting the object brightness and generating brightness data in response thereto; exposure-data memory means for receiving and storing the brightness data and storing the shutter characteristic value, and control signal generating means for reading the brightness data and shutter characteristic value from said exposure-data memory means and generating the drive signal pulses in response thereto.

4. A program shutter for automatic exposure control as in claim 2; wherein said lens aperture means includes a spring for opening or closing a shutter, said spring having a characteristic spring constant, and said stored shutter characteristic value is dependent on said spring constant.

5. A program shutter for automatic exposure control as in claim 2; wherein said lens aperture means includes a pair of pivotally supported sectors having characteristic inertias, and said stored shutter characteristic value is dependent on said inertias.

* * * * *